(12) United States Patent
Hamid

(10) Patent No.: US 11,461,489 B2
(45) Date of Patent: *Oct. 4, 2022

(54) METHOD AND SYSTEM FOR SECURING DATA

(71) Applicant: Larry Hamid, Ottawa (CA)

(72) Inventor: Larry Hamid, Ottawa (CA)

(*) Notice: Subject to any disclaimer, the term of this patent is extended or adjusted under 35 U.S.C. 154(b) by 73 days.

This patent is subject to a terminal disclaimer.

(21) Appl. No.: 16/943,568

(22) Filed: Jul. 30, 2020

(65) Prior Publication Data

US 2020/0364362 A1 Nov. 19, 2020

Related U.S. Application Data

(63) Continuation of application No. 16/105,536, filed on Aug. 20, 2018, now abandoned, which is a continuation of application No. 14/815,657, filed on Jul. 31, 2015, now Pat. No. 10,055,601.

(60) Provisional application No. 62/031,251, filed on Jul. 31, 2014.

(51) Int. Cl.
| | |
|---|---|
| *G06F 21/62* | (2013.01) |
| *H04L 9/08* | (2006.01) |
| *G06F 21/60* | (2013.01) |
| *G06F 21/00* | (2013.01) |

(52) U.S. Cl.
CPC ........ *G06F 21/6218* (2013.01); *G06F 21/602* (2013.01); *H04L 9/083* (2013.01); *H04L 9/088* (2013.01); *H04L 9/0819* (2013.01); *H04L 9/0894* (2013.01)

(58) Field of Classification Search
CPC . H04L 9/08; H04L 9/083; H04L 9/088; H04L 9/0891; H04L 9/0894; H04L 9/0819; G06F 21/60; G06F 21/602; G06F 21/62; G06F 21/6218
See application file for complete search history.

(56) References Cited

U.S. PATENT DOCUMENTS

| | | | | |
|---|---|---|---|---|
| 7,136,903 | B1 * | 11/2006 | Phillips | G06F 16/10 709/217 |
| 2014/0019753 | A1 * | 1/2014 | Lowry | H04L 9/083 713/155 |

* cited by examiner

*Primary Examiner* — Edward Zee
(74) *Attorney, Agent, or Firm* — Aventum IP Law LLP

(57) ABSTRACT

A first access key, which is provided by a key server for decrypting a file and the encrypted file is published on a public network by a first user. Every time the secured file is accessed by a second user, the first access key is provided by the key server to decipher the file. The first user can control access to the file by deleting the first access key on the key server, thus denying the second user access to the access key preventing de-encryption of the secured file.

10 Claims, 10 Drawing Sheets

METHOD AND SYSTEM FOR SECURING DATA

CROSS-REFERENCE TO RELATED APPLICATIONS

This application is a continuation of U.S. patent application Ser. No. 16/105,536 filed Aug. 20, 2018. U.S. patent application Ser. No. 16/105,536 is a continuation of U.S. patent application Ser. No. 14/815,657 filed Jul. 31, 2015. U.S. patent application Ser. No. 14/815,657 claims the benefit of U.S. Provisional No. 62/031,251 filed Jul. 31, 2014.

FIELD OF THE INVENTION

The invention relates to the field of data storage and more particularly to the field of secure data storage.

BACKGROUND

The use of social networks has allowed unprecedented sharing of personal information. This presents a constant privacy concern, which is repeated by privacy advocates worldwide. Typically, individuals publish information to the Internet without any concern for privacy. Later, if and when the information proves problematic, the individuals regret having posted it. As is well known, once information is uploaded to a public location on the Internet, it is permanently out there. Even with repeated attempts to remove such information, it is often easily found on archive servers or Internet history servers. Further, information is often stored locally by people for later access.

Another set of problems relates to the very effort involved in limiting access to public information. For example, The Barbra Streisand Effect occurs when someone indicating that they are concerned about publicly available information causes the information to be much more widely consumed. In today's world of rapid communication, merely objecting to people seeing or reading something causes many to go look at it themselves. As such, even the process of trying to protect one's privacy results in significant invasion of privacy.

It would be advantageous to provide an enhanced method for disseminating information that overcomes at least some of the drawbacks of the prior art.

SUMMARY OF THE INVENTION

In accordance with an embodiment of the invention there is provided a method comprising: providing a first data file; requesting an encryption key from a key server by a first user via a communication network; receiving from the key server a first encryption key, the first encryption key for securing the first data file, the first encryption key associated with the first user; providing the first encryption key to the key server for storage in a key data store of the key server in association with the first user and a first identifier of the first user, the first user having management privileges over the first encryption key; securing the first data file with the first encryption key; associating the secured first data file with the first identifier; and publishing the secured first data file to a public network.

In an embodiment securing the first data file comprises securing portions of the first data file with the first encryption key.

Some embodiments comprise providing a second data file; requesting an encryption key from the key server by a second user via the communication network; receiving from the key server a second encryption key, the second encryption key for securing the second data file, the second encryption key associated with the second user; providing the second encryption key to the server for storage in the key data store of the key server in association with the second user and a second identifier, the second user having management privileges over the second encryption key and the first user other than having management privileges over the second encryption key; securing the second data file with the second encryption key; associating the secured second data file with the second identifier; and publishing the secured second data file to a public network.

Some embodiments comprise receiving the first secured data file by a third user; requesting an access key from the key server by the third user via the communication network, the request including data relating to the secured first data file; based on verification of the data, receiving from the key server the access key associated with the first secured data file and other than associated with the first user, the access key for deciphering the secured data file; and using the access key, deciphering the secured data file.

Some embodiments comprise associating a secure application with the secured first data file; providing the secure application to a third user; requesting an access key from the key server by the secure application via the communication network, the request including data relating to the secured first data file; based on verification of the data, the secure application receiving from the key server the access key associated with the secured data file and other than associated with the first user, the access key for deciphering the secured data file; and using the access key, deciphering the secured data file by the secure application.

In an embodiment the data comprises a hash of the secure first data file.

Some embodiments comprise providing the first identifier from the first user to the key server; and deleting the first encryption key associated with the first identifier and the first user.

Some embodiments comprise providing a first identifier from a first user to the key server; and denying access to the access key for decoding the secured first data file to a user.

Some embodiments comprise providing the first identifier from a first user to the key server; associating a second identifier of a third user with the creation key and providing it to the key server; requesting an access key from the key server by the third user via the communication network, the request including data relating to the secured data file and the access key for decoding the first secured data file; and based on the first identifier and second identifier, performing one of either: denying the access key to the third user and providing the access key to the third user.

Some embodiments comprise providing by the third user an identifier to the key server; and based on the identifier, denying an access key to the third user, the access key for decoding the secured first data file.

Some embodiments comprise providing by the third user a password to the key server; and based on the password, denying an access key to the third user, the access key for decoding the secured first data file.

Some embodiments comprise providing the time to the key server; and based on the time, denying an access key to a user;

Some embodiments comprise viewing the deciphered secured first data file within an application in execution on a computer, the application comprising a file duplication function; initiating the file duplication function on the deciphered secured first data file within the application; and other than duplicating the deciphered secured first data file.

Some embodiments comprise in response to the initiated file duplication function, duplicating the secured first data file.

Some embodiments comprise viewing the deciphered secured first data file within an application in execution on a computer, the application comprising a file cut and paste function; initiating the file cut and paste function on the deciphered secured first data file within the application; and other than performing a file cut and paste function on the deciphered secured first data file.

Some embodiments comprise in response to the initiated file cut and paste function, duplicating data in a secured form, secured with a same encryption key as the first data file.

Some embodiments comprise viewing the deciphered secured first data file within an application in execution on a computer, the application comprising a print function; initiating the print function on the deciphered secured first data file within the application; and other than performing the file print function on the deciphered secured first data file.

Some embodiments comprise viewing the deciphered secured first data file within an application in execution on a computer, the application comprising a save function; initiating the save function on the deciphered secured first data file within the application; and other than performing the file save function on the deciphered secured first data file.

Some embodiments comprise in response to the initiated file save function, saving the secured first data file.

Some embodiments comprise prior to initiating the save function, modifying the deciphered secured first data file.

Some embodiments comprise in response to the initiated file save function, encrypting the modified and deciphered secured first data file to form a secured modified data file and saving the secured modified data file.

Some embodiments comprise viewing the deciphered secured data file within an application in execution on a computer, the application comprising a file cut and paste function and the deciphered secured first data file comprising a watermark; performing a file cut and paste function on the deciphered secured first data file within the application to a storage device; automatically deleting the pasted deciphered secured first data file from the storage device; requesting an encryption key from the key server via a communication network; receiving from the key server a third creation encryption key, the third creation encryption key for securing the deciphered secured first data file, the third creation encryption key associated with the first user and first encryption key; storing the third encryption key in the key data store of the key server in association with the first user, the first identifier, the first user having management privileges over the third creation encryption key; securing the first data file with the third creation encryption key; associating the secured first data file with the first identifier; and saving the secured first data file to the storage device.

In an embodiment the third creation encryption key comprises the first encryption key.

In accordance with an embodiment of the invention there is provided a method comprising: providing a first data file; requesting an encryption key from a key server by a first user via a communication network; receiving from the key server a first encryption key, the first encryption key for securing the first data file; securing the first data file with the first encryption key to form a secured data file; storing the first encryption key in a key data store of the key server in association with the secured data file; and publishing the secured first data file to a public network for unrestricted access thereto.

Some embodiments comprise requesting, by a secure application, an access key for deciphering the secured first data file, the access key related to the secured first data file and for access thereto; receiving the access key from a key server; and deciphering the secured first data file with the access key by the secure application.

In accordance with an embodiment of the invention there is provided a method comprising: providing a first data file; requesting an encryption key from a key server by a first user via a communication network; receiving from the key server a first encryption key, the first encryption key for securing the first data file; securing the first data file with the first encryption key to form a secured data file; storing the first encryption key in a key data store of the key server in association with the secured data file; and publishing the secured first data file to a public network.

In accordance with an embodiment of the invention there is provided a system comprising: providing a first key server; providing a second other key server; providing a first file for public access, the first file encoded with a cipher in reliance upon a key associated with the first file and stored within the first key server; providing a second file for public access, the second file encoded with a cipher in reliance upon a key associated with the second file and stored within the second key server; upon accessing the first file, retrieving from the first key server the associated key for deciphering thereof, the associated key accessible to the public via at least one secure process and other than accessible to other than the at least one secure process; and upon accessing the second file, retrieving from the second key server the associated key for deciphering thereof, the associated key accessible to the public via the at least one secure process and other than accessible to other than the at least one secure process.

In an embodiment wherein within each of the first and second file is stored an indication of a key server having the associated key stored therein.

In an embodiment wherein a broker server has stored therein data relating the associated key associated with the first file to the first key server.

In an embodiment wherein a broker server has stored therein data relating the associated key associated with the second file to the second key server.

Some embodiments comprise duplicating the first key server to form the second other key server.

In accordance with an embodiment of the invention there is provided a method comprising: providing a first key server; and providing a first file for public access, the first file encoded with a cipher in reliance upon a first key associated with the first file and stored within the first key server, the first key available via a secure process to members of the public; providing a second file other than for public access, the second file encoded with a cipher in reliance upon a second key associated with the second file and stored within the first key server, the second key available to some users and unavailable to other users via the secure process.

In accordance with an embodiment of the invention there is provided a method comprising: providing a first key server; providing a first file for public access, the first file encoded with a cipher in reliance upon a first key associated with the first file and stored within the first key server, the first key available via a secure process to members of the public when requested; and providing a second file other than for public access, the second file encoded with a cipher in reliance upon a second key associated with the second file and stored within the first key server, the second key available via the secure process in response to some requests and other than available in response to other requests via the secure process.

In accordance with an embodiment of the invention there is provided a system comprising: a plurality of files ciphered and stored, each file associated with a cipher key and some files associated with different cipher keys for being accessed by a same individual; a file access table indicating a plurality of files for access by an individual and a location of each said files; and a secure file access process for accessing files listed within the file access table, for retrieving a cipher key associated with an accessed file and for deciphering the accessed file for access by a user, the secure file access retrieving cipher keys related to the accessed file and other than related to the individual, access to the cipher key restricted based on user authorization of the individual.

In accordance with an embodiment of the invention there is provided a method comprising: providing a first HTML data file; encrypting the first data file with a creation key to provide a secured first data file, the secured first data file accessible with an access key related to the creation key; publishing the secured first HTML data file to a network store from which it is accessible by a plurality of individuals each relying upon the access key related to the creation key; storing the access key in association with a file identifier for identifying the secured first data file within the key server, the key server for distributing the access key in response to a request therefore from a secure process; accessing a URL associated with the secured first HTML data file; retrieving a key associated with the secured first HTML data file; and securely deciphering by a secure process having access to the access key, the secured first HTML data file to display a content thereof.

In accordance with an embodiment of the invention there is provided a method comprising: providing a first data file; encrypting the first data file with a creation key to provide a secured first data file, the secured first data file accessible with an access key related to the creation key; storing within the secured first data file an indication of a first key server associated therewith; publishing the secured first data file to a network store from which it is accessible by a plurality of individuals each relying upon the access key related to the creation key; and storing the access key in association with a file identifier for identifying the secured first data file within the first key server, the first key server for distributing the access key in response to a request therefor from a secure process.

In accordance with an embodiment of the invention there is provided a method comprising: providing a first data file; encrypting the first data file with a creation key to provide a secured first data file, the secured first data file accessible with an access key related to the creation key; deleting the creation key once the secured first data file is stored; publishing the secured first data file to a network store from which it is accessible by a plurality of individuals each relying upon the access key related to the creation key; storing the access key in association with a file identifier for identifying the secured first data file within a key server, the key server for distributing the access key in response to a request therefore from a secure process; and receiving from a secure process a request for the access key, providing the access key to the secure process for use in decrypting the secured first data file to view contents thereof.

In accordance with an embodiment of the invention there is provided a method comprising: providing a first data file by a first user; encrypting the first data file with a creation key to provide a secured first data file, the secured first data file accessible with an access key related to the creation key; and publishing the secured first data file to a social network store from which it is accessible by a plurality of individuals based on their connection to the first user and each relying upon the access key related to the creation key, the access key provided to one of the social network software and a plug-in for the social network software to decrypt the secured first data file and display contents thereof inline with a social feed from the social network.

In accordance with an embodiment of the invention there is provided a method comprising: providing a first data file by a first user; encrypting the first data file with a creation key to provide a secured first data file, the secured first data file accessible with an access key related to the creation key; publishing the secured first data file to a social network store from which it is accessible by a plurality of individuals based on their connection to the first user and each relying upon the access key related to the creation key; and without affecting the data stored within the social network, preventing access to the secured first data file by deleting the access key.

In accordance with an embodiment of the invention there is provided a method comprising: providing a first data file by a first user; encrypting the first data file with a creation key to provide a secured first data file, the secured first data file accessible with an access key related to the creation key; publishing the secured first data file to a social network store from which it is accessible by a plurality of individuals based on their connection to the first user and each relying upon the access key related to the creation key; and without affecting the data stored within the social network, preventing access to the secured first data file by restricting access to the access key for some users.

In accordance with an embodiment of the invention there is provided a method comprising: storing an access key under control of a first user; and encrypting by the first user a first file using a creation key to produce a secured data file for being accessed with the access key, the secured data file secured for the benefit of the first user, the secured first data file for public distribution and for public consumption, the secured first data file for being deleted by the first user when the first user deletes the access key.

In an embodiment the creation key is associated with the access key.

In an embodiment the creation key is a same key as the access key.

In an embodiment members of the public with access to the secured data file are provided access to decoded contents thereof until the access key is deleted by the first user.

In accordance with an embodiment of the invention there is provided a method comprising: storing an access key under control of a system timer; and encrypting a first file using a creation key to produce a secured data file for being accessed with the access key, the secured data file secured for public distribution and for public consumption, the secured first data file for being deleted upon expiry of the system timer.

BRIEF DESCRIPTION OF THE DRAWINGS

Embodiments of the invention will now be described with reference to the drawings in which like numbered elements are similar and in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Definitions

Creation key/access key pair—a creation key is for encrypting data and an access key is for decrypting data. Examples include RSA or elliptic curve encryption public/private key pairs. Typically, for creation/access key pairs, neither key is public in nature and, as such, a symmetric key is another example of a creation/access key pair.

The technology of encryption has advanced significantly over the past few decades. What was once merely a method of obscuring valuable communications to prevent unwanted access has now become a ubiquitous method for communication management. Encryption is still used to protect data from unwanted access, but it is also used to support digital rights management (DRM), to secure simple transactions, to authenticate transactions, to digitally sign documents, and so forth. Further, with the advances in processing technology, the processing costs for encrypting data has greatly fallen and, as such, encryption is now very widely used.

Figure 1:
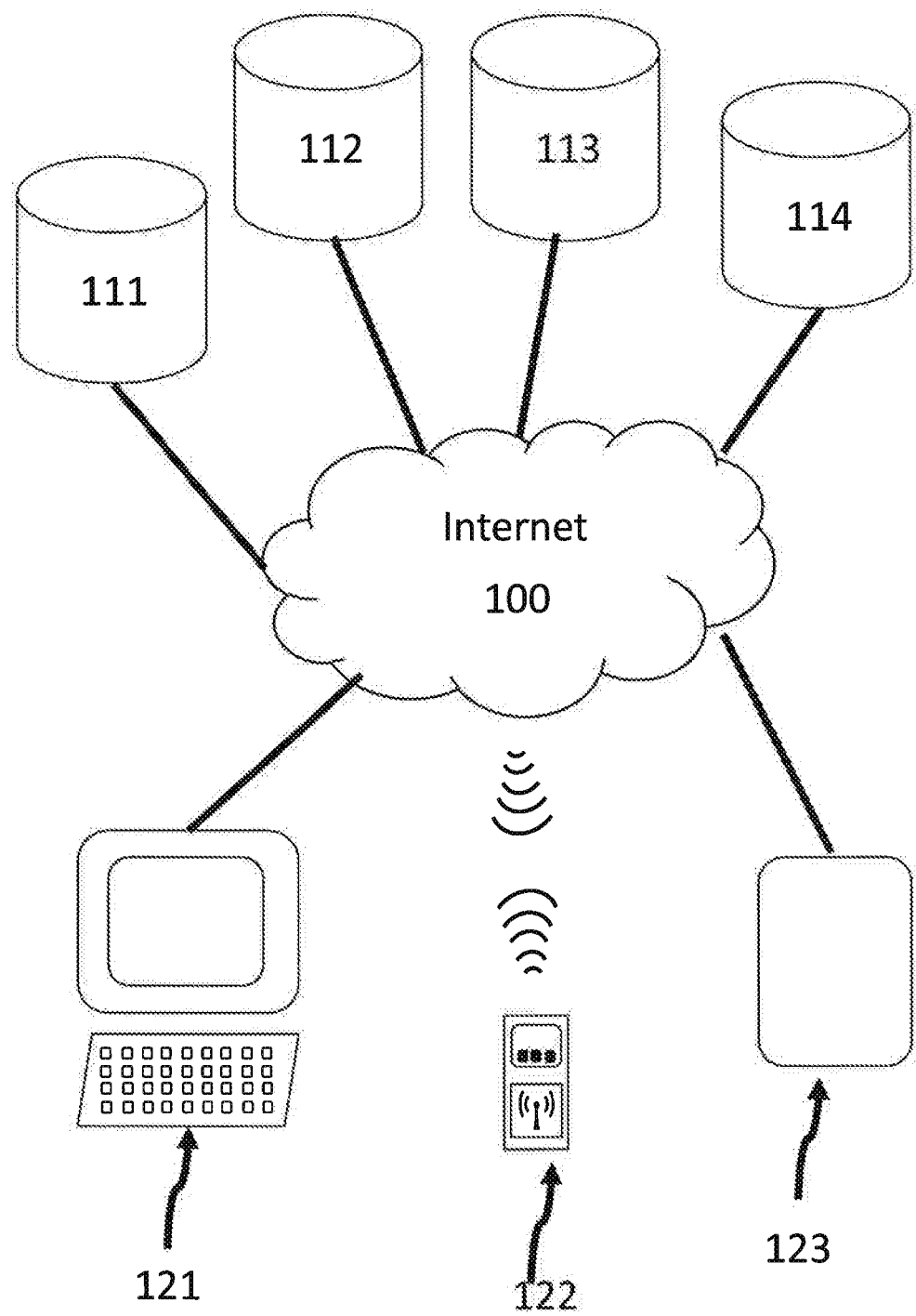
FIG. 1 is a simplified general block diagram of an exemplary computing environment.

Referring to FIG. 1, shown is a simplified network diagram showing a plurality of servers 111, 112, 113, and 114 coupled to a wide area network 100 in the form of the Internet. A plurality of user access points (AP) is coupled to the wide area network and includes workstation 121, mobile phone 122, and tablet 123. Server 114 also acts as a workstation. Each of the devices 111, 112, 113, and 114 and 121, 122, and 123 are able to communicate data one with another. Optionally, the data is stored locally. Further optionally, the data is stored on another system, for example a system coupled to the wide area network. Data in transit is subject to interception and storage. Data in received files may be stored or further communicated after initial receipt. Thus, once data has left a first system via the wide area network, tracking or managing its distribution is nearly impossible. Further, data is easily portable with flash drives and other removable media making its dissemination difficult to monitor or control.

Figure 2:
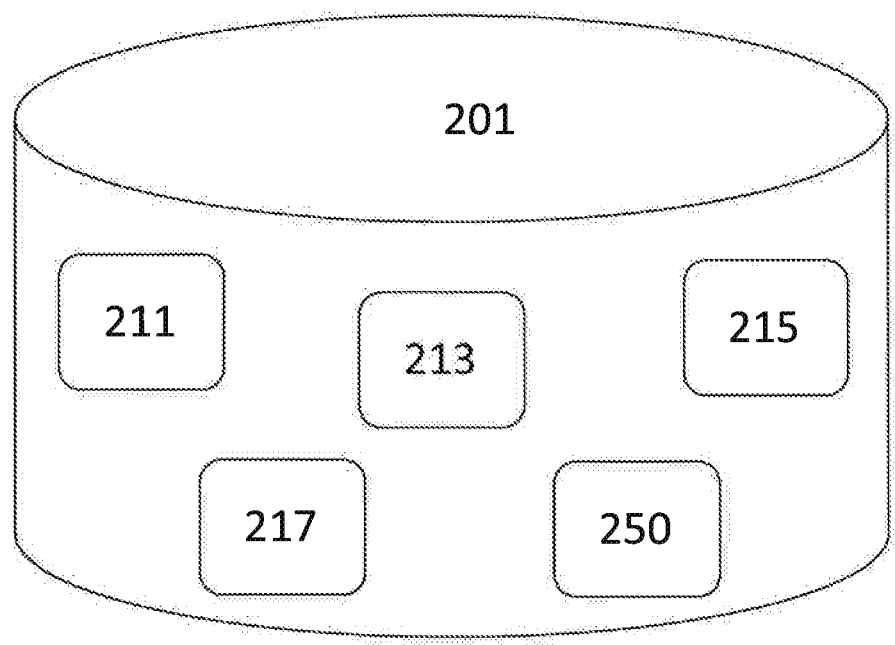
FIG. 2 is a simplified general block diagram of a key server.

Referring to FIG. 2, shown is a key server 201. The key server 201 manages cipher keys for distributing same to systems requesting those keys. The key server 201 processes key requests to distribute keys in accordance with a known standard. Alternatively, another method of key distribution is used. As shown, key server 201 comprises an access key store 211 for storing access keys, a key identification engine 213 for indexing and identifying the stored keys, a key manager 215 for managing the access keys, a key distribution engine 217 for distributing the access keys, and a key deletion engine 250 for deleting access keys.

Figure 3:
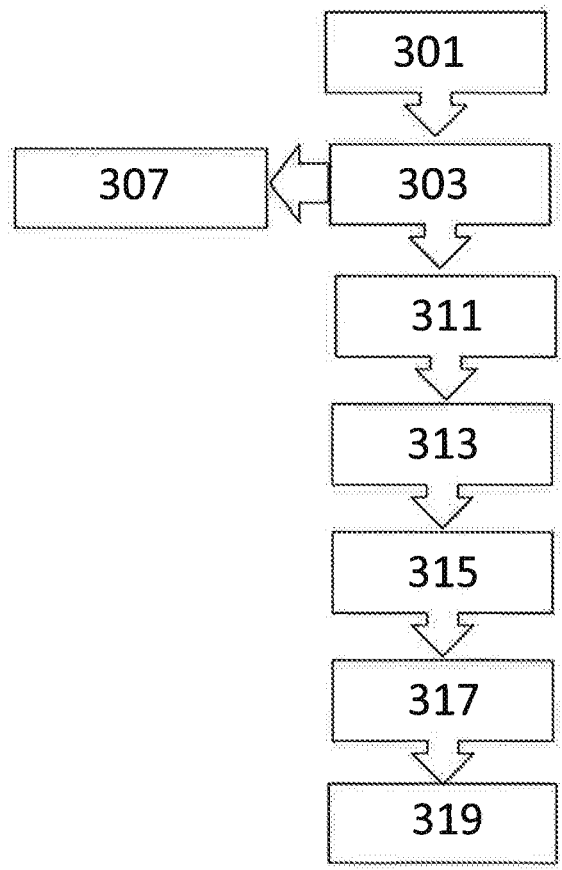
FIG. 3 is a simplified flow diagram of a method of securing data for enhancing privacy relying on a key server.

Referring to FIG. 3, shown is a simplified flow diagram of a method of securing data for enhancing privacy relying on the key server 201 of FIG. 2. A first user creates a file at 301. For example, the file comprises an image of the first user. The first user decides to secure the file for privacy at 303. If it is not to be secured, the file is published to the Internet at 307. If the file is to be secured, a request is provided to the key server 201 at 311. At key server 201, a key pair is associated with the first user at 313 and the creation key or the key pair is provided to the system of the first user. At 315 the access key portion of the key pair is stored within key store 211 and identification data identifying the first user is stored for access by the key identification engine 213.

At 317, the first user system secures the file using the received creation key and then publishes the secured file to the Internet. Upon securing the file, a file identifier associated with the file, for example a hash of the secured file, is provided to the key identification engine 213 to associate the file, the first user and the access key stored within the key store 211 at 319.

A second user trying to access the secured file without access to the key server 201 is presented with obfuscated data that is other than useful thereto.

Figure 4:
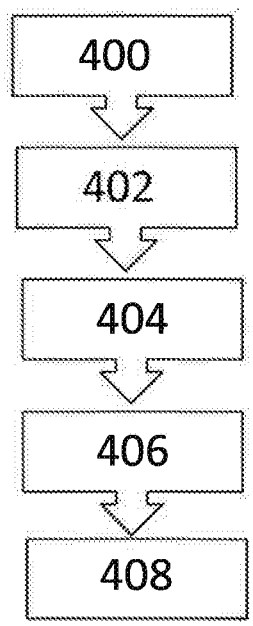
FIG. 4 a simplified flow diagram of a method of decrypting a secure file.

Referring to FIG. 4, shown is a simplified flow diagram of a method of decrypting the secure file. The second user executes a secure application at 400. The secure application, for example is provided by the same source as the key server. Alternatively, the secure application uses an application programming interface (API) provided for accessing secured files such as the secured file. Further alternatively, the secured application is tested and certified as a secure application. At 402 the secure application accesses the secured file. The secure application requests an access key associated with the secure file from the key server 201 and is provided an access key in accordance with a secure methodology at 404. For example, requesting the access key is performed based on the secured file. For example, the file comprises identification information for use in requesting an access key. Alternatively, the secured file is hashed and the hash forms part of the request for identifying and/or indexing the associated access key. Once an access key is returned to the secure application at 406, the secured file is deciphered and the data therein presented to the second user at 408. In this example, the second user sees the image that was stored within the original file.

Encryption is often used based on a key of the recipient such that what is sent is not decipherable to the sender and is only decipherable by the intended recipient. In such a model, each ciphered document has one intended recipient. In contrast, where a key is associated with a source user and a file, it is typically referred to as a digital signature indicating the source of the file to those that receive it. Here, the key is associated with a source but access to the file is provided to a large number of individuals—even to the public—without the source of the file losing control. The source maintains control over the access key and as such over access to the file.

Though the method above is described with a key pair, it is also applicable to use a symmetric key as the secure application is being provided the key from the key server in order to maintain security of the key.

Figure 5:
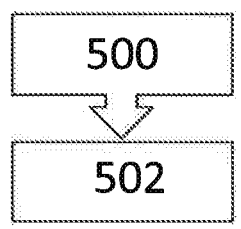
FIG. 5 a simplified flow diagram of a method of deleting a secure file.

Referring to FIG. 5, shown is a simplified flow diagram of a method of deleting a secured data file. At 500 the first user provides to key server 201 a request to delete the secured data file. The key server 201 makes the access key for accessing the secured data file inaccessible at 502. Now, without the access key, deciphered data from within the secure data file is inaccessible. Optionally, the key is deleted from the key server, thereby permanently restricting access to the deciphered secured file data—effectively deleting the plain text version of the file. Of course, the first user probably maintains an original copy of the plain text file and can redistribute same in accordance with the above methodology or in accordance with another methodology at a later time. Alternatively, the file is re-secured with a new creation key and redistributed at intervals to limit its spread within the Internet.

Alternatively, the first user requests for the key server to restrict access to the secured data file for certain users, allowing still some users to access the access key while other users are prevented. For example, each secured data file has associated permissions to allow only specific users to access the associated access key. Optionally, rules can be applied that also control access to the access key based on other factors.

By restricting operations of the secure application, duplication of the deciphered secured file is optionally restricted. By restricting operations of the secure application, cut and paste within the deciphered secured file is optionally restricted. By restricting operations of the secure application printing of the deciphered secured file is optionally restricted. By restricting operations of the secure application, publishing of the deciphered secured file is optionally restricted. Alternatively, by restricting operations of the secure application, another function on the deciphered secured file is restricted.

Advantageously, copying of the secured data file is optionally unrestricted since the secured data file is inaccessible in plain text absent access to and response from the key server.

Figure 6:
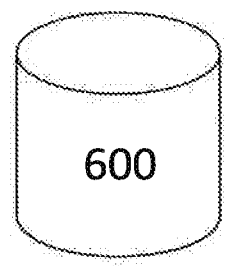
FIG. 6 is a simplified general block diagram of another key server.

Referring to FIG. 6, shown is a simplified diagram of another embodiment of a key server. The key server 600 manages cipher keys for securing said file and to de-secure said file relying on file data obfuscation such as encryption. A file shared with another user is encoded with a creation key an access key relating to which is stored in association therewith on the key server. The file is then freely distributed. Accessing the file results in accessing of the key server to retrieve the access key and decipher the file. The process of deciphering the file is performed independent of user IDs, logins, and other passwords. Thus, each file so secured is freely distributed and distributable.

Figure 7:
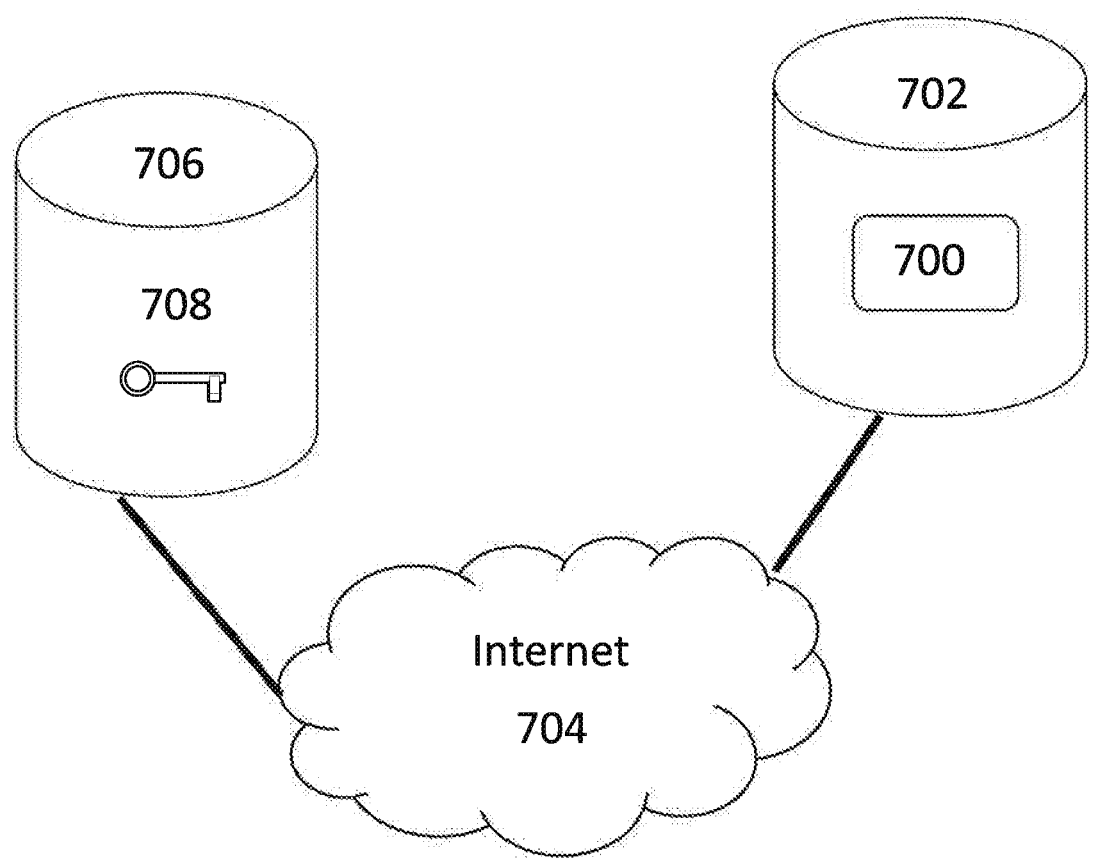
FIG. 7 is a simplified diagram of system wherein a file is deleted from the Internet.

Referring to FIG. 7, shown is a simplified diagram of system wherein a secure file is deleted from the Internet. Secure file 700 has been stored on a server 702 coupled to a WAN, for example the Internet 704. Perhaps file 700 has been copied, backed up, stored locally, and linked to many times on/from computers coupled to the Internet (not shown). The user who first uploaded the file deletes the access key 708 stored on the key server 706, also coupled to the Internet 704. By doing so, none of the files or copies thereof on the computers are accessible as the access key is no longer accessible. Thus, the secure file 700, though digitally available in all its copies, no longer provides accessible content as the access key is denied to users. As such, the secure file 700 is thereby effectively deleted. Advantageously, whether the secure file 700 is distributed in an Instagram®, a tweet, a Facebook® post, an uploaded image, an uploaded video, a blog, or any other mechanism, the contents of the secure file in plain text are deletable after posting. This allows for purging of posts that would otherwise be perpetually available via the World Wide Web.

Figure 8:
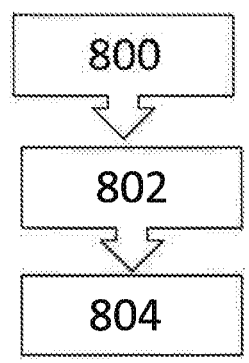
FIG. 8 is a simplified flow diagram of a method to limit access to a secured data file.

Referring now to FIG. 8, shown is a simplified flow diagram of a method to limit access to a secure data file. For example, at 800 a user accesses a secured data file. For example, a secure application receives an access key from the key server and decodes the secured data file for the user to view the file. At 802 the user attempts to save the un-secured file. Alternatively, the user modifies the un-secured file and attempts to save the modified un-secured file. At 804, the un-secured file is other than saved by the user. Alternatively, only the secured data file is saved by the user. This limits storage of the file, thus restricting access to the file. Further alternatively, the modified unsecured file is secured with the same creation key and saved in association with the access key entry within the key server allowing the file to be deleted by deleting the access key. Further alternatively, the modified unsecured file is secured with a second creation key/second access key pair and saved in association with the index for the access key for the original file within the key server allowing the file to be deleted when the access key is deleted by deleting the second access key as well.

Figure 9:
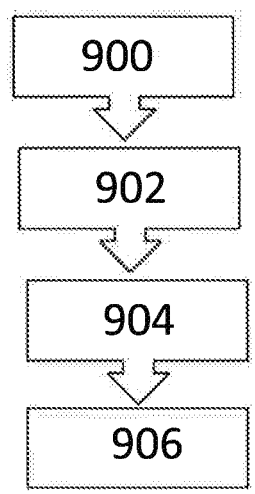
FIG. 9 is a simplified flow diagram of another method to limit access to a secured data file.

Shown in FIG. 9, is a simplified flow diagram of a method to limit access to a secured data file. For example, at 900 a user views a decoded secure data file, decoded via one of the methods described above. The user performs a cut and paste operation on the decoded secure data file at 902. When pasted to a storage device, the decoded secure data file is automatically re-secured with the original creation key and using one of the methods described above at 904. At 906 the re-secured data file is stored on the storage device.

Alternatively, a user selects various portions of a plurality of decoded secured data files and cuts and pastes the plurality of portions into a new data file. Each portion of the new data file is re-secured with the original creation key associated with a user, identity and an original secured data file from which each portion came. The new data file with secured portions are saved to the storage device. Optionally, there are other portions of the new data file that are unsecured and in plain text. Further optionally, the first user chooses to encode the new data file using one of the methods described above with a new creation key. Thus, portions of secured new data file are encoded multiple times, limiting access to the secured new data file. Alternatively, each portion is only secured one time.

As is evident, when portions of a document are each secured with a different creation key, deletion of an associated access key deletes the portion of the document and no the entire document. For example, a user Tweets a photograph, which is secured. The photograph is embedded in a document titled, "What never to do when using Twitter®" which becomes quite popular. The user who tweeted the photograph sees the document and deletes the access key. Thus the photograph within the Tweet is no longer accessible, nor is the photograph within the document. That said, the document may continue to be accessed until it too is deleted.

Figure 10:
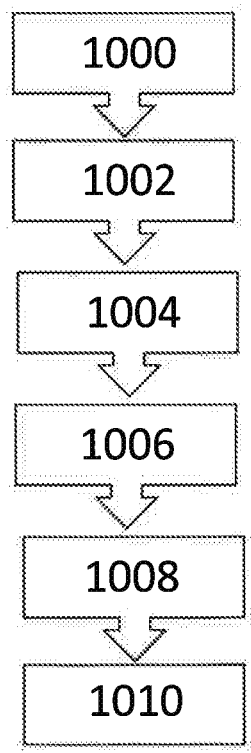
FIG. 10 shown is a simplified flow diagram of a method to limit access to a secured data file with a watermark.

Shown in FIG. 10 is a simplified flow diagram of a method for securing a data file. A secure data file has an incorporated fingerprint/watermark at 1000. At 1002 a first user accesses the secure data file. An access key is used to decode the secure file at 1004, for example a secure application receives an access key from a key server and deciphers the secure data file. The first user performs a "cut and paste" operation on the deciphered file at 1006, pasting it into a file for storage. Based on the presence of the fingerprint/watermark, the "cut and paste" operation initiates a bot at 1008, which deletes the deciphered file in storage and re-encodes the file with another creation key received from the key server. Alternatively, the watermark is detected by a security layer that encrypts the file prior to storage thereof. Alternatively, the file is encoded with the original creation key. The first user accesses the copied secure file at 1010 and the copied secure file must be decoded again, for example by a secure application, to be viewed. Alternatively, only a portion of the file is secured and the remainder is stored in plain text.

Figure 11:
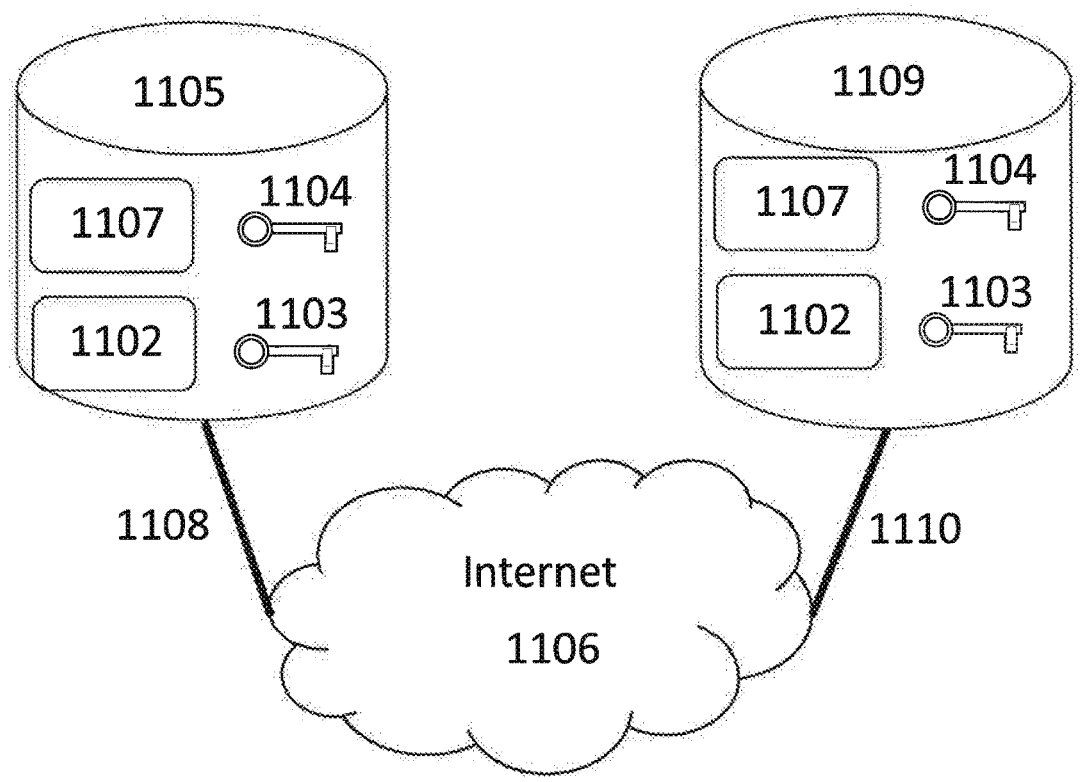
FIG. 11 shows a simplified block diagram of a system for securing a data file.

Now referring to FIG. 11, shown is a simplified block diagram of a system for securing a data file. A user creates a file and wishes to secure the file by encryption. A software application in execution on the server 1105 coupled to the Internet 1106 via communication link 1108 generates a key pair—a creation key 1104 and an access key 1103. Optionally, a single key is generated to act as both the creation key and the access key. The software application encodes the file with the creation key 1104 and creates a secure file 1107 that is stored on server 1105. Remote server 1109 is also coupled to the Internet 1006 via communication link 1110. The software application transmits to remote server 1109 an identifier of the secure file 1107, identifier of the user 1105, and the access key 1103 that is then stored on remote server 1109. By implementing this method the user has control over the generation of the creation key 1104 and the access key 1103. Should another user wish to view the secure file 1107 in decrypted form, the software application is provided the access key by server 1109. Optionally, each secured data file has associated permissions to allow only users with certain usernames or access credentials to access the associated access key. Optionally, you can also control access to the access key based on other conditions such as policies, time of day, geography, preconditions, and other events.

Figure 12:
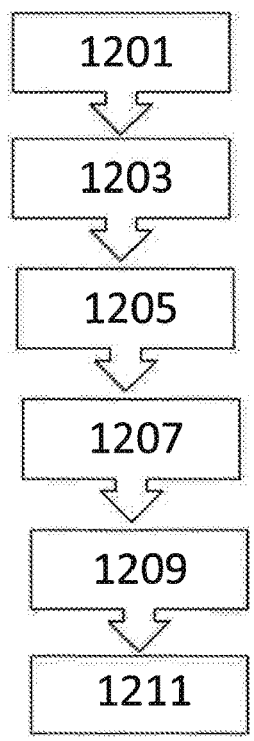
FIG. 12 shows a simplified flow diagram for another method for securing a data file.

FIG. 12 shows a simplified flow diagram for a method to secure a data file. At 1201 a user creates an unsecure file, for example a text file. The user transmits the text file to a remote key server at 1203 for encryption. The remote key server generates a creation key and an access key at 1205. Next, at 1207, the remote server encrypts the text file with the creation key. The secure file is transmitted from the remote key server to the server at 1209 to one of the user and an indicated destination or a predetermined destination. An association of the file, identifier of the user, and the access key is formed on the remote key server at 1211 to allow key retrieval based on the file or the user.

Figure 13:
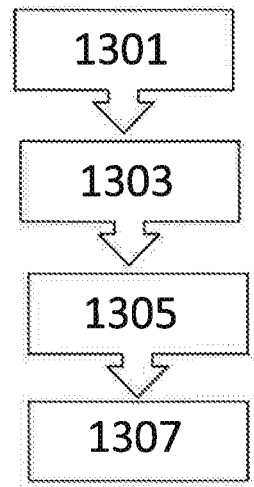
FIG. 13 shows a simplified flow diagram for a method to decode a file by a publicly available secure process.

Now referring to FIG. 13, shown is a simplified flow diagram for a method to decode a file by a publicly available secure process. For example, a secure application for decoding a secure file is publicly distributed at 1301. A user initiates the execution of the application on a local system in order to decode the secure file at 1303. The application retrieves an access key from a remote key server and decodes the secure file at 1305. The application deletes the access key provided by the remote key server at 1307 such that once the file is closed, the application must retrieve the access key from the remote server in order to re-decode the secure file to access the file. No user identity or password is required for the application to retrieve the access key as the application is secure and the file is publicly available. Once the file is closed, access to that file is no longer supported without retrieving the access key again.

Figure 14:
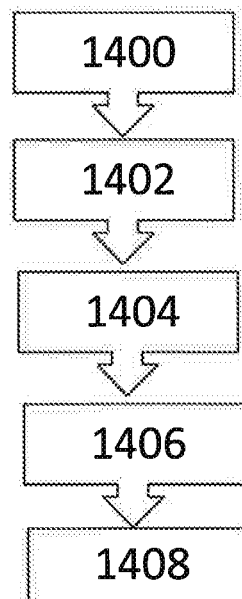
FIG. 14 shows a simplified flow diagram of a method of deleting a secured data file.

FIG. 14 shows a simplified flow diagram of a method of deleting a secured data file. At 1400, the first user provides to a key server a request to delete the secured data file. The key server makes the access key for accessing the secured data file inaccessible at 1402, for example by deleting the key from the key server. Alternatively, the access key may be disabled through the application of policies. Further alternatively, the access key may be made unusable by encrypting it using its own access key to restrict the use of the first access key. Now, without the access key, deciphered data from within the secure data file is inaccessible. Optionally, a second user viewing the decoded secure file within a secure application at 1404 has the document closed. For example, the key server transmits a message to the secure application at 1406 based on a record of secure applications that accessed the now inaccessible access key. At 1408 the secure application closes the file and the file is deleted.

Though the above embodiment has key access to the access key based on a request from a secure application, it is possible to further restrict key access based on policies, time frames, user identification, and so forth.

In fact, key creation and distribution models often differ depending on the specific application or focus of an embodiment. When used as a backup tool, the embodiments listed above are beneficial because a security breach of a backup store is addressable through file deletion to prevent file access, while the backup service would benefit from a cloud services model with unlimited data storage and high reliability.

For a backup implementation, files to be backed up are secured and then uploaded to a cloud based backup service. Even though the files are now in the cloud and a security breach may allow someone to access the files, key restrictions will prevent access to those files and key deletion will delete access to a plain text version of the files. Thus, for example, a continuous backup of a file system to the cloud is secured by the process and deletion of specific files or the entire backup is supported.

When a plain-text or traditionally secured backup is stored locally, for example the files from which the backup is made, then once the backup is deleted a new backup is optionally formed with a new key.

Alternatively, a scraper scrapes local systems and only backs up files that are already secured. Further alternatively, the scraper only backs up files that are already secured with key access policies that are restricted.

In yet another embodiment, a backup is formed locally, for example on a local server, accessible within an enterprise. Alternatively, the local backup is secured but the key to access same is accessible locally. A second other backup is formed in accordance with the above embodiment allowing deletion thereof by deleting an associated access key stored on a key server. When the second other backup is deleted, a new second other backup can be formed. In an embodiment, the second other backup is automatically deleted and replaced at intervals.

Of course, the local accessible backup is also useful for reissuing individual files when an access key is deleted from the key server or when policies relating to an access key are modified and more secured copies of a file each secured differently are desired.

In another embodiment, file retention policies are implemented using the above technology. Each file is secured and an access key therefore is stored on a key server. For each file, the access key has an associated expiration date. For example, for financial files it is 7 years, for emails it is 6 months, and so forth. When the expiration date is reached, the associated access key is deleted leaving the data inaccessible. In such a fashion, the data and copies of the data are all inaccessible at once leaving, for example, that spreadsheet that was taken home 6 months ago or that saved email message inaccessible.

In some implementations, files that are expired, have their access keys deleted, are located and deleted. For example when the file is accessed and the key is unavailable because it is deleted, the key server responds indicating that the file is deleted and the actual secured file is deleted locally to remove obfuscated data that is inaccessible and simply wasting storage space.

It is often preferred to store within a file, security data that is unlikely to be changed relative to that file and the file data itself. Security data that will be modified or that may be modified is best stored on the server, because security settings and policies would be (a) difficult to update one very copy of the secured data file and (b) difficult to universally implement without access to each copy of the secure data file. As such, security data relating to access, policies, and so forth is stored in association with the access key within, for example, the key server. Alternatively it is stored within a security server accessible to the key server. Further alternatively it is stored within a security server with access to the key server. In contrast, within the secured data file is stored information that does not typically change such as a key identifier, a file owner identifier, a hash, a file creation date, etc. As those data are not used to modify security parameters of a file, they are well suited to being stored within the file. Alternatively no data is stored within the file other than the secured file data. Further alternatively, other data is stored within the file that is not modified when modifying security settings for the file other than deleting the file or identifying the file/access key relation.

Though the above embodiments focus on an ability to delete a file, in some cases the above method is applied to a group of files. For example a work project folder is secured using a same creation key and having a same access key allowing the entire folder and project to be shared and deleted in accordance with the above embodiments. Though such an implementation restricts per file control, it increases reliability if an entire folder is to be deleted since the entire folder is deleted by deleting a single key and tracking of file documents and which ones to delete is no longer necessary.

In an embodiment, a bot is deployed within cloud based storage systems to interact with the key server to determine expired files and to clear them from the storage on a regular or ongoing basis. These bots would improve storage efficiency in deleting any files that are already "deleted" through deletion of their access key. Advantageously, files uploaded to storage at any time once a key is deleted would be cleared by the bots, improving storage utilization efficiency.

In fact, using the above method purely to maintain storage efficiency is possible, where files are stored in association with a key and when the key is removed or expired, then the file is removed in the background from wherever it is stored. In such a system, duplicates, for example a server copy, a local copy, a dropbox copy, an FTP copy, etc. are all associated one with another by the security key and can be managed in unison without, in real time, finding and deleting each copy of the file. A simple application is file version management wherein all copies of a file that are "checked out" of version management are secured in accordance with the above described embodiment(s) and when a new version of the file is created, older versions are expired. Bots then clean up the older versions such that only the current version of the file is accessible. In form driven businesses, such an application would often prevent submission of outdated forms.

Figure 15:
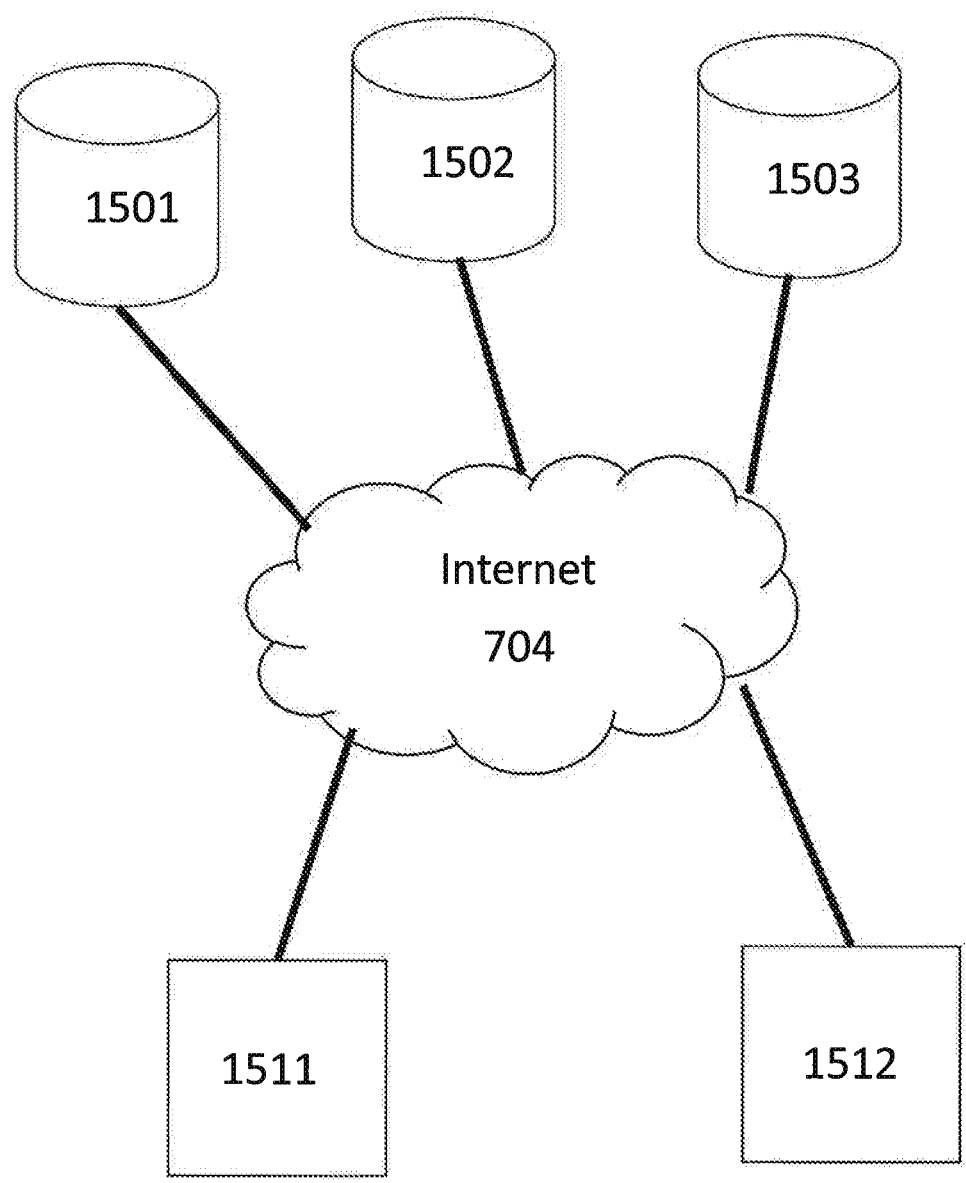
FIG. 15 shows a simplified network diagram of an embodiment wherein multiple key servers are deployed in communication with the Internet.

Referring to FIG. 15, shown is a simplified network diagram of an embodiment wherein multiple key servers 1501, 1502, and 1503 are deployed in communication with the Internet 704. The key servers support multiple entities 1511 and 1512. Here, an identifier within each file indicates a key server where the associated key is stored. When a file is accessed, the identified key server is contacted and the key is provided in accordance with policies of the identified key server. Similarly, key deletion is managed by policies within each key server. Using such an architecture allows for distribution of key server load, distribution of key server activity, and distribution of policy enforcement. Such an architecture further supports varied policies and key server response parameters. When key servers support different policies and processes, then a same user may use several key servers in order to benefit from the different policies or processes.

Figure 16:
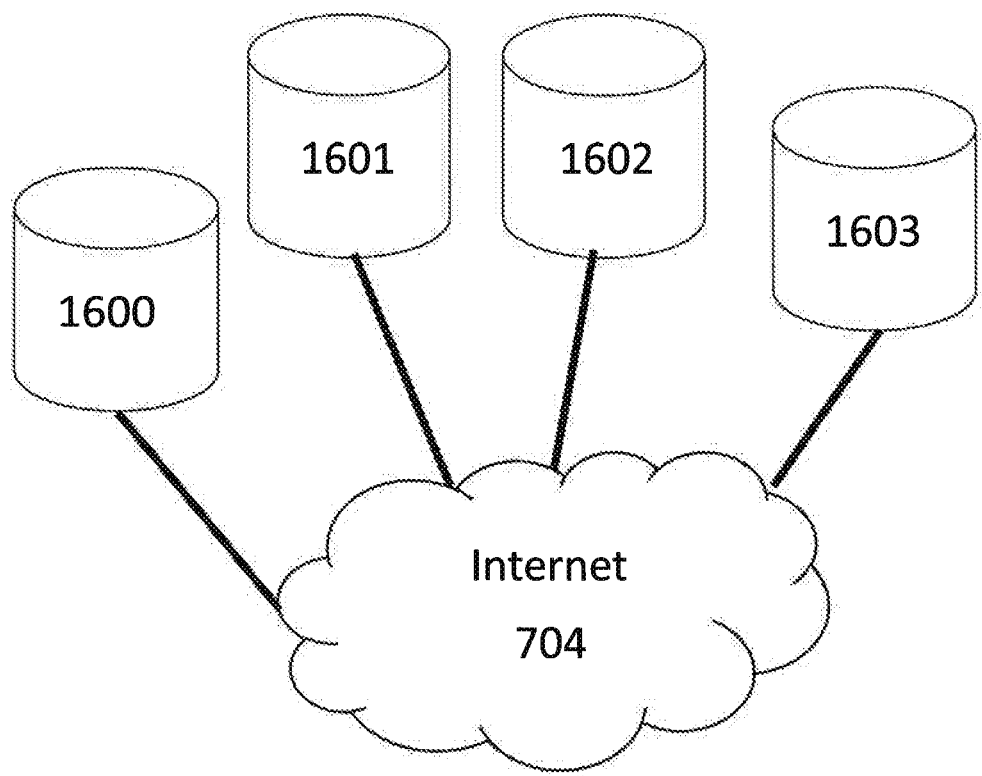
FIG. 16 shows a simplified block diagram of an embodiment wherein multiple key servers are deployed supporting multiple entities.

Referring to FIG. 16, shown is a simplified block diagram of an embodiment wherein multiple key servers are deployed supporting multiple entities. Here, a broker key server 1600 is contacted via the Internet 704 for key server access. The broker key server 1600 directs a requestor to a key server 1601, 1602, 1603 indicated for each file, a key server where the associated key is stored. Each key server optionally supports different processes and/or policies. As shown, some key servers are coupled to the key broker 1600 while others are remote therefrom 1601 and 1603.

Figure 17:
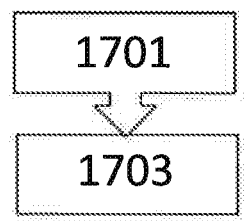
FIG. 17 shows a simplified flow diagram of a method of supporting multiple entities with multiple key servers.
Figure 18:
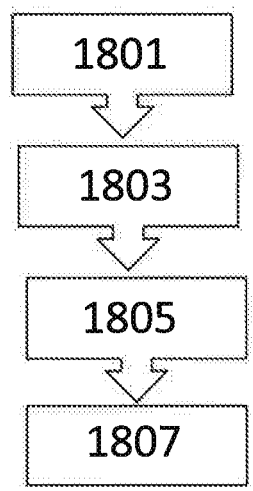
FIG. 18 shows a simplified flow diagram of a URL translation method.

Referring to FIG. 17, shown is a simplified flow diagram of a method of supporting multiple entities with multiple key servers. Here, a request is provided to each key server until a match is found—a key server is found where the associated key is stored. In order for such a method to support many of the above features, it is preferred that available key servers be finite and known. For example, a list of known key servers is stored on a broker key server. Alternatively, the list of known key servers is stored and duplicated in a fashion similar to DNS Referring to FIG. 18, shown is a simplified flow diagram of a URL translation method. Here, some elements within a web site comprise support for secured and unsecured file data. When the data is secured, the URL acts to translate the secured content into viewable content at the user's system. For example, a browser or a plug-in for a browser retrieves the key from the key server in order to provide access to the web-page. Since most web pages are not meant to be changed by the user, the resulting system provides similar web functionality while maintaining the ability to delete web content at a later time. In such a system, static web sites are encoded using a method as described hereinabove. The encoded site content is provided in response to a URL associated with the site contents. For example, site contents are in HTML. The HTML is provided to a browser that supports encoded data and that is trusted by the key server. The browser then retrieves the key from the key server, decodes the encoded data, disables functions such as copy and paste and displays the web site content within the browser window. Alternatively, a browser plug-in retrieves and displays the data.

When the site is changed or removed, the site owner disables or deletes the security key associated therewith and thereby effectively deletes the site contents wherever they have been saved, backed-up, stored, indexed, etc.

Figure 19:
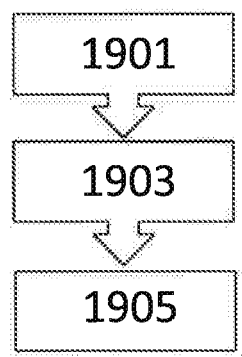
FIG. 19 shows a simplified flow diagram of a method of supporting default content.

Referring to FIG. 19, shown is a simplified flow diagram of a method of supporting default content. The default content reflects data to be displayed when an access key is unavailable or no longer available. For example, though a person may update their profile with a new photograph weekly, a default photograph is on file such that when the present photograph is deleted by deleting the key providing access thereto the default image is displayed. Default content is specified and stored in unencoded form. Alternatively, even the default content is encoded.

Examples of default content include a thick black bar to be inserted to indicate that text data has been redacted, a generic corporate logo or image, an historical image, a place-holder indicating that the content is unavailable, and so forth. Alternatively, a public domain image is used in place of a specific image. Further alternatively, default content is selected at a time that the key access is determined to be unavailable; for example, an artificial intelligence process selects content that is similar to the content that was there when known or to the content identifier.

In some embodiments a file for being secured comprises HTML data. In such cases, accessing a URL with the secured HTML data file or accessing data within the secured HTML data file by a compatible application results in a request to the key server to retrieve an access key therefore. This allows World Wide Web Sites and other Web content to be secured for later deletion. Advantageously, signatures or other embedded HTML content can be deleted when no longer current, for example. Further web sites themselves can be deleted as can some web tools used within web sites. For example, if a portion of a secured web site is copied and the copied portion remains encoded, then deleting the access key results in the copied portion becoming inaccessible. This is easily understood with respect to pictures embedded into World Wide Web Sites, but also applies to text, file data, widgets, etc.

Numerous other embodiments may be envisaged without departing from the scope of the invention.

What is claimed is:

1. A method comprising:
providing a first data file;
requesting an encryption key from a key server by a first user via a communication network;
receiving from the key server a first encryption key, the first encryption key for securing the first data file;
securing the first data file with the first encryption key to form a secured first data file, the secured first data file for only being accessed in plain text using the first encryption key;
storing the first encryption key in a key data store of the key server in association with the secured first data file;
publishing the secured first data file to a public network for unrestricted access to the first secured data file; and
publishing a secure process for accessing a secure fashion the first encryption key from the key server, the first encryption key for use in decrypting the secured first data file to access the first data file, the secure process other than supporting copying of the first encryption key and other than supporting copying the first data file such that the first data file is accessible via the secure process and the first encryption key and such that the first data file is rendered inaccessible via the public network from the secured first data file by making the first encryption key inaccessible to the secure process.

2. A method according to claim 1 comprising:
requesting, by the secure process in execution, the first encryption key for deciphering, the secured first data file, the first encryption key related to the secured first data file, the first encryption key other than associated with one or more users;
receiving the first encryption key from the key server; and
deciphering the secured first data file with the first encryption key by the secure process.

3. A method according to claim 1 wherein making the encryption key inaccessible to the secure process comprises deleting the encryption key from all key servers accessible to the secure process.

4. A method comprising:
providing a first key server;
providing a second other key server;
providing a secure process;
providing a first file for public access, the first file encoded with a cipher in reliance upon a key associated with the first file and having a first access key stored within the first key server, the first access key for use by the secure process for deciphering the first file to provide access to data deciphered from the first file;
providing a second file for public access, the second file encoded with a cipher in reliance upon a key associated with the second file and having a second access key stored within the second other key server, the second access key for use by the secure process for deciphering the second file to provide access to data deciphered from the second file;
upon accessing the first file, retrieving from the first key server the first access key associated with the first file and stored within the first key server for deciphering the first file, the first access key accessible via the secure process and other than accessible other than via the secure process, deleting by the secure process the first access key that was retrieved from the first key server when one of the secure process and the first file is closed; and upon accessing the second file, retrieving from the second other key server the second access key for deciphering the second file, the second access key stored within the second other key server accessible via the secure process and other than accessible other than via the secure process, deleting by the secure process the retrieved second access key that was retrieved from the second other key server when one of the second file and the secure process is closed.

5. The method according to claim 4 wherein within each of the first file and second file is stored an indication of a key server having the first access key associated with the first file and the second access key associated with the second file stored therein, the first access key retrievable by the secure process from an indicated key server in an unrestricted manner.

6. The method according to claim 4 comprising storing within a broker server first data indicating that the first access key is stored within the first key server.

7. The method according to claim 6 comprising storing within the broker server second data indicating that the second access key is stored within the second other key server.

8. The method according to claim 4 comprising:
duplicating the first key server to form the second other key server.

9. A method comprising:
providing a first key server; and
providing a first file for public access, the first file encoded with a cipher in reliance upon a first key associated with the first file; the first key stored within the first key server, deciphered data from the first file decipherable with the first key, the deciphered data available via a secure process to all members of the public, the deciphered data inaccessible other than via the secure process and other than with the first key;
providing a second file other than for public access, the second file encoded with a cipher in reliance upon a second key associated with the second file; the second key stored within the first key server, the second key available to some users and unavailable to other users via the secure process.

10. A method comprising:
providing a first key server; and
providing a first file for public access, the first file encoded with a cipher in reliance upon a first key associated with the first file and stored within the first key server, encoded data from the first file decipherable with the first key to provide deciphered data, the deciphered data available via a secure process to members of the public unrelated to the first key associated with the first file, the deciphered data inaccessible other than via the secure process using the first key;
providing a second file other than for public access, the second file encoded with a cipher in reliance upon a second other key associated with the second file and stored within the first key server, the second other key available for use by the secure process for some users and unavailable for other users.

* * * * *